(12) United States Patent
Abdelhamid et al.

(10) Patent No.: US 9,784,376 B2
(45) Date of Patent: Oct. 10, 2017

(54) CHECK VALVE ASSEMBLY

(71) Applicant: TRANE INTERNATIONAL INC., Piscataway, NJ (US)

(72) Inventors: Yahia Abdelhamid, Onalaska, WI (US); Scott Joseph Smerud, La Crosse, WI (US); Scott Michael Branch, Tomah, WI (US); John Robert Sauls, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 443 days.

(21) Appl. No.: 14/333,460

(22) Filed: Jul. 16, 2014

(65) Prior Publication Data

US 2015/0020885 A1    Jan. 22, 2015

Related U.S. Application Data

(60) Provisional application No. 61/846,794, filed on Jul. 16, 2013.

(51) Int. Cl.
*F16K 15/02* (2006.01)

(52) U.S. Cl.
CPC ....... *F16K 15/023* (2013.01); *Y10T 137/0318* (2015.04); *Y10T 137/7837* (2015.04)

(58) Field of Classification Search
CPC ............. F16K 15/023; Y10T 137/0318; Y10T 137/7837; Y10T 137/7904; Y10T 137/7913; Y10T 137/7915; Y10T 137/7932; Y10T 137/7933; Y10T 137/7934
See application file for complete search history.

(56) References Cited

U.S. PATENT DOCUMENTS

| | | | |
|---|---|---|---|
| 718,771 A * | 1/1903 | Kerfoot | F16K 15/02 137/533.31 |
| 2,170,478 A | 8/1939 | Long et al. | |
| 2,809,660 A | 10/1957 | Becker | |
| 4,172,465 A | 10/1979 | Dashner | |
| 4,911,196 A | 3/1990 | Kemp | |
| 5,375,621 A | 12/1994 | Gaehwiler | |
| 5,584,676 A | 12/1996 | Dreiman | |
| 6,024,126 A | 2/2000 | Miller et al. | |
| 6,039,073 A * | 3/2000 | Messick | F16K 15/063 137/515.7 |
| 6,427,711 B1 * | 8/2002 | Kemp | F16K 15/026 137/15.18 |
| 6,527,524 B2 * | 3/2003 | Cook | F04B 1/02 137/535 |

(Continued)

*Primary Examiner* — Jessica Cahill
*Assistant Examiner* — Frederick D Soski
(74) *Attorney, Agent, or Firm* — Hamre, Schumann, Mueller & Larson, P.C.

(57) ABSTRACT

A valve assembly for a compressor includes a flow passage defining an inlet, an outlet, and a valve seat located proximate the inlet. The valve assembly also has a valve member that includes a head portion engageable with the valve seat. The head portion has a front face, a rear face located closer to the outlet than the front face, and a side face extending between the front and rear faces. The head portion further has a first convex curvature formed between the front face and the side face. The valve member also includes a collar portion extending toward the outlet from the rear face of the head portion.

10 Claims, 8 Drawing Sheets

(56) References Cited

U.S. PATENT DOCUMENTS

| | | | |
|---|---|---|---|
| 7,066,722 B2 | 6/2006 | Dreiman et al. | |
| 7,628,016 B2 * | 12/2009 | Vogt | F02B 37/013 |
| | | | 137/220 |
| 8,136,547 B2 | 3/2012 | Francini et al. | |
| 8,381,764 B2 * | 2/2013 | Matsubara | F16K 15/063 |
| | | | 137/220 |
| 8,544,493 B2 * | 10/2013 | Huang | F16K 15/063 |
| | | | 137/220 |
| 2006/0054848 A1 * | 3/2006 | Vogt | F02B 37/013 |
| | | | 251/77 |
| 2009/0000676 A1 * | 1/2009 | Gellweiler | F16K 15/026 |
| | | | 137/543 |
| 2009/0220370 A1 * | 9/2009 | Kano | F04C 29/126 |
| | | | 418/110 |
| 2010/0200087 A1 * | 8/2010 | Andrews | F16K 15/021 |
| | | | 137/528 |
| 2012/0057964 A1 | 3/2012 | Yang et al. | |
| 2012/0060943 A1 | 3/2012 | Huang et al. | |
| 2013/0019745 A1 * | 1/2013 | Bagagli | F04B 39/1013 |
| | | | 91/418 |
| 2013/0092864 A1 * | 4/2013 | Andersson | F16K 15/063 |
| | | | 251/337 |

* cited by examiner

US 9,784,376 B2

CHECK VALVE ASSEMBLY

FIELD

This disclosure relates generally to refrigeration systems, and more particularly, but not by way of limitation, to check valve assemblies used in refrigeration compressors.

BACKGROUND

Check valve assemblies can be used in fluid systems of various types to permit fluid flow in one direction therethrough while preventing fluid flow in the opposite direction. Various designs of check valve assemblies have been developed for refrigeration compressors for controlling discharge of compressed gas flows.

SUMMARY

The present valve assembly provides a reduced amount of flow restriction for compressed gas in passing through a discharge valve assembly of the compressor. The reduced restriction results in decreased pressure loss, therefore reducing the amount of power required by the compressor and increasing the overall operating efficiency of the compressor.

In some embodiments, a valve assembly can be configured to have a first convex curvature formed between a front face and a side face of a disc shaped head. This helps streamline the flow of compressed gas when the flow passes around the front and side faces of the head, thereby reducing turbulence as compressed gas flows over a front portion of the disc shaped head.

Moreover, the valve assembly can be configured to have a second convex curvature formed between the side face and a rear face of the disc shaped head. This helps streamline the flow of compressed gas when the flow passes around the side and rear faces of the head, thereby reducing turbulence as compressed gas flows over a rear portion of the disc shaped head.

Further, the valve assembly can be configured to have a concave curvature formed between the rear face of the head and a side face of a collar connected to the rear face of the head. This helps streamline the flow of compressed gas when the flow passes over the rear face of the head and the side face of the collar, thereby reducing turbulence as compressed gas flows over a side portion of the collar.

In addition, the valve assembly can be configured to have a plurality of vanes extending radially outwardly from the collar portion to help enlarge effectively the cross sectional area of the flow passage, thereby reducing flow obstruction through the valve assembly, for example, this can mean maximizing availability of the space of the flow passage and/or minimizing the impact due to obstruction of the structure of the valve.

Particular embodiments include a valve assembly for a compressor having a flow passage defining an inlet, an outlet, and a valve seat located in a vicinity of, such as for example toward or proximate, the inlet. The valve assembly also has a valve member that includes a head portion engageable with the valve seat. The head portion has a front face, a rear face located closer to the outlet than the front face, and a side face extending between the front and rear faces. The head portion further has a first convex curvature formed between the front face and the side face. The valve member also includes a collar portion extending toward the outlet from the rear face of the head portion. In some embodiments, such as shown herein, a plurality of vanes extend radially outwardly from the collar portion.

In some embodiments, the valve member includes a head portion having a front face, a rear face opposite to the front face, and a side face extending between the front and rear faces. The head portion has a first convex curvature formed between the front face and the side face. The valve member further includes a collar portion extending rearwardly from the rear face of the head portion. In some embodiments, such as shown herein, a plurality of vanes extend radially outwardly from the collar portion.

Other embodiments include a method of guiding or directing compressed gas to flow through a valve assembly. The method includes guiding the compressed gas to pass around a valve member disposed in a flow passage, streamlining a flow of the compressed gas when the flow passes around a first convex curvature formed between a front face and a side face of the head. The flow passage defines an inlet, an outlet, and a valve seat located in a vicinity of, such as for example toward or proximate, the inlet. The valve member includes the head portion engageable with the valve seat. The head portion has the front face, a rear face located closer to the outlet than the front face, and the side face extending between the front and rear faces. The valve member also includes a collar portion extending toward the outlet from the rear face of the head portion. In some embodiments, such as shown herein, a plurality of vanes extend radially outwardly from the collar portion.

In particular embodiments, the head portion of the valve member can further have a second convex curvature formed between the rear face and the side face of the head portion. In some embodiments, the collar portion of the valve member has a transition section having a concave curvature formed between a front end of the collar portion and a side face of the collar portion. In other embodiments, the collar portion has a minimum diameter of approximately ½ of the diameter of the head portion. In further embodiments, the valve member further comprises an outer ring such that the vanes are extending radially between a side face of the collar portion and the outer ring.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference symbols used in the drawings indicate like elements.

DETAILED DESCRIPTION

The present valve assembly provides a reduced amount of flow restriction for compressed gas passing through a discharge valve assembly of a compressor. The reduced restriction results in decreased pressure loss, therefore reducing the amount of power required by the compressor and increasing the overall operating efficiency of the compressor. Also, this can help improve compressor output at certain power usage due to reduced flow restriction.

In some embodiments, a valve assembly for a compressor includes a flow passage defining an inlet, an outlet, and a valve seat located in a vicinity of, such as for example toward or proximate, the inlet. The valve assembly also has a valve member that includes a head portion engageable with the valve seat. The head portion has a front face, a rear face located closer to the outlet than the front face, and a side face extending between the front and rear faces. The head portion further has a first convex curvature formed between the front face and the side face. The valve member also includes a collar portion extending toward the outlet from the rear face of the head portion. In some embodiments, such as shown herein, a plurality of vanes extend radially outwardly from the collar portion.

The terms "on," "front," "rear," "left," "right" and the like used herein are in reference to the relative positions of the compressor, the discharge valve assembly and its constituent parts, as oriented in the specific figures being described. These terms are not meant to be limiting in any way.

Figure 1:
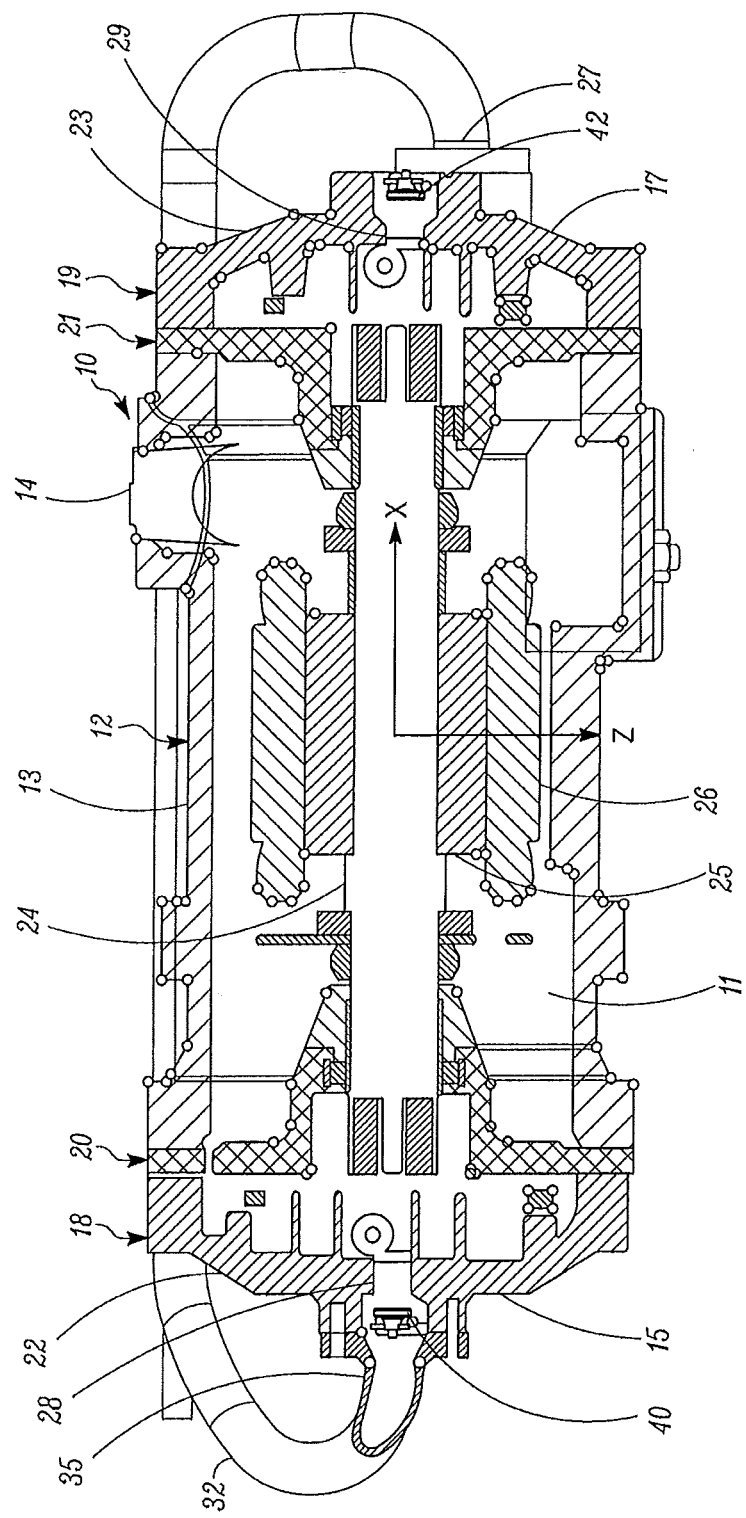
FIG. 1 is a cross sectional view of one example of a compressor that employs a check valve assembly according to one embodiment.

Referring to FIG. 1, a two stage scroll compressor 10 is described in this disclosure. However, it is to be understood that the present check valve assembly may be applicable for other types of rotary compressors, such as single stage scroll compressors, rotary compressors, rotary vane compressors, pumps, reciprocating compressors, centrifugal compressors, or the like.

The scroll compressor 10 includes a housing 12 having a side wall 13, a first end wall 15 and a second end wall 17 generally opposite to the first end wall 15. The side wall 13 and the first and second end walls 15 and 17 define an interior space 11 that is large enough to contain a stator 26, a rotor 25 driven by the stator 26, a pair of first stage compressor members, e.g., a first fixed scroll member 18 and a first orbiting scroll member 20, and a pair of second stage compressor members, e.g., a second fixed scroll member 19 and a second orbiting scroll member 21. The first fixed scroll member 18 has a first scroll end plate 22. The second fixed scroll member 19 has a second scroll end plate 23.

The first and second orbiting scroll members 20, 21 are driven by a drive shaft 24 on which the rotor 25 is mounted. The stator 26 drives the rotor 25 to rotate which, in turn, causes rotation of the drive shaft 24. Rotation of the shaft 24, in turn, drives the first and second orbiting scroll members 20, 21.

The housing 12 includes a first stage suction port 14, through which gas to be compressed enters the space 11, a first stage discharge port 28 defined in the first scroll end plate 20, through which the compressed gas exits from a discharge fitting 35 on its way to a second stage suction port 27 located near the second end wall 17 through a first tube or line 32. A second stage discharge port 29 which is located near the second end wall 17 allows the compressed gas to exit the compressor 10 for example to a condenser. It is to be understood that the housing 12 can have other configurations than that described herein.

A first stage discharge valve assembly 40 is located downstream of the first stage discharge port 28 to open and close the port. Likewise, a second stage discharge valve assembly 42 is located downstream of the second stage discharge port 29 to open and close the port.

When the compressed gas is discharged through the discharge valve assemblies 40, 42, momentary gas turbulence may be created around the outer surface of the valve members. The turbulence can result in a drop in the efficiency of the compressor. Once past the second stage discharge assembly 42, the compressed gas exits compressor 10 and flows for example to a condenser.

Figure 2A:
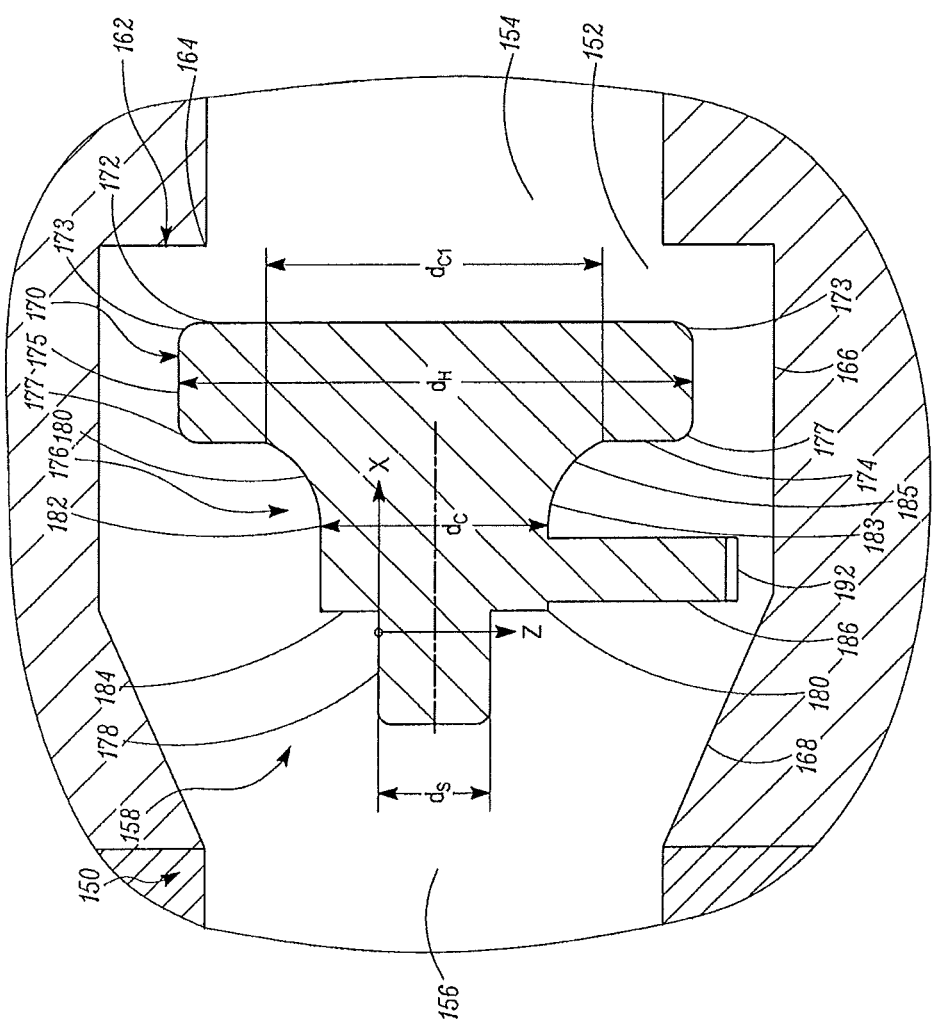
FIG. 2A is a cross sectional view of one embodiment of a check valve assembly when the check valve assembly is in an open position.
Figure 2B:
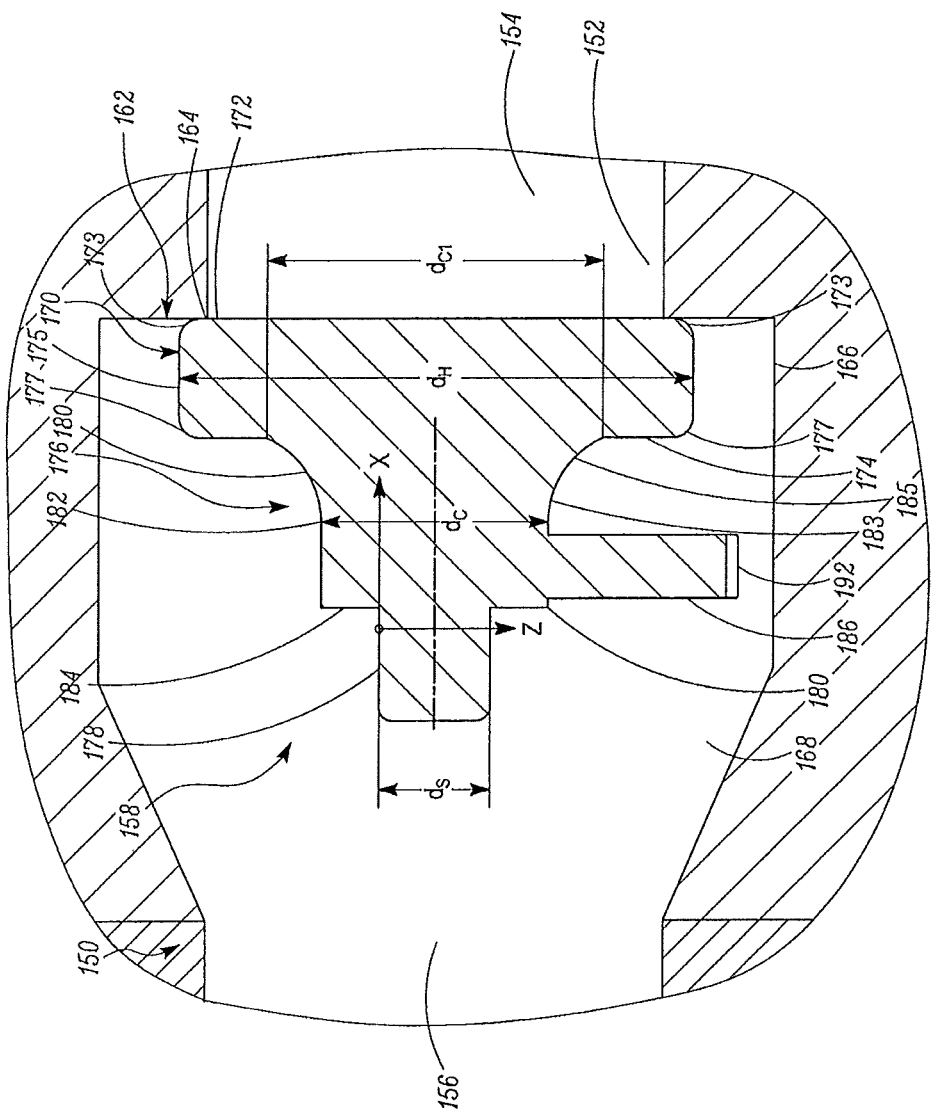
FIG. 2B is a cross sectional view of the check valve assembly of FIG. 2A, when the check valve assembly is in a closed position.
Figure 3:
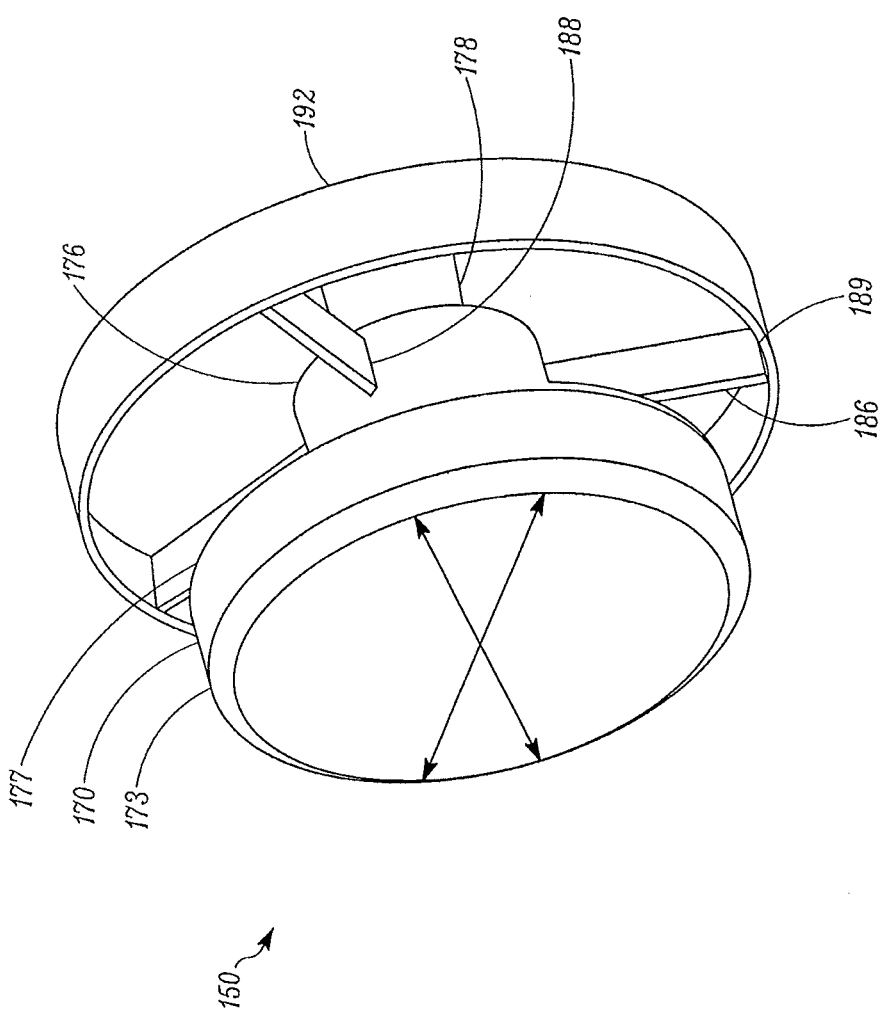
FIG. 3 is a perspective view of a valve member of the check valve assembly of FIGS. 2A-B.

Referring now to FIGS. 2A-B and 3, a discharge valve assembly 150 is configured to permit compressed gas to be discharged through the valve assembly 150, while preventing the discharged gas or the air outside of the compressor to flow back into the compressor. It is to be understood that the discharge valve assembly 150 can be used for example in either of the first stage discharge assembly 40 or the second stage discharge assembly 42 in a two stage compressor such as shown in FIG. 1. It can also be used as a discharge valve assembly in other types of compressors described above.

The valve assembly 150 includes a generally tubular flow passage 152 for controlling flow, for example, from a discharge port 154 through, for example, a discharge fitting 156. The flow passage 152 also includes a valve member 158 disposed in the flow passage 152.

The flow passage 152 is configured to allow the compressed gas to flow from the discharge port 154 to the discharge fitting 156. The discharge port 154 feeds compressed gas to an inlet located at the opening of the flow passage 152, where the inlet is located proximate to a valve seat 164. The valve seat 164 can be defined by an annular front wall 162 of the flow passage 152. The valve seat 164 is engageable with the valve member 158 to substantially block the flow passage 152.

In some embodiments, the flow passage 152 further has a cylindrically shaped front side wall 166 extending rearwardly in an axial direction from an outer edge of the annular front wall 162, and a conical shaped rear side wall 168 extending from a rear edge at the end of the front side wall 166 in the axial direction, tapering inwardly from a diameter corresponding to the diameter of the cylindrical shape front side wall 166 to a smaller diameter corresponding to an inner diameter of the discharge fitting 156.

Referring to FIGS. 2A-B, a diameter of the flow passage 152 is slightly greater than a corresponding diameter of the valve member 158, thereby allowing a clearance space to be formed between the valve member 158 and the flow passage 152. The flow passage 152 can be made of metal such as but not limited to iron or steel.

The valve member 158 includes a disc shaped head 170, a collar 176 extending rearwardly from the head 170, a stem 178 extending rearwardly from the collar 176. In some embodiments, the valve member 158 can further include a plurality of vanes 186 extending radially from the collar 176. The vanes 186 can help center the valve member 158 in the flow passage 152. The collar 176 has a diameter that is smaller than the head 170, but greater than the stem 178. In some embodiments, the head 170, the collar 176 and the stem 178 are coaxial, such as shown in FIGS. 2A-B.

In some embodiments, the head 170, the collar 176 and the stem 178 can be formed integral to each other. However, it is to be understood that the head 170, the collar 176 and the stem 178 can be made separately and assembled together.

Referring to FIGS. 2A-B and 3, the head 170 is a disc shaped structure having a front face 172, a rear face 174 and a side face 175 extending between the front face 172 and the rear face 174. The head 170 has a diameter of $d_H$. In some embodiments, the diameter $d_H$ can range from a diameter larger than that of the discharge port 154 but smaller than the diameter of a discharge plenum, e.g., flow passage 152 defined by the side wall 166.

A convex curvature 173 is formed between the front face 172 and the side face 175. A radius of the convex curvature 173 can range from about 1 mm to about half of a width of the head 170, for example, a distance defined between the front and rear faces 172, 174. In some embodiments, the convex curvature 173 has a radius of about 2 mm. Also, a convex curvature 177 is formed between the rear face 174 and the side face 175. A radius of the convex curvature 177 can range from about 1 mm to about half of a width of the head 170, for example, a distance defined between the front and rear faces 172, 174. In some embodiments, the convex curvature 177 has a radius of about 2 mm. In some embodiments, the head 170 can be fabricated of sheet metal by a stamping process.

Referring to FIGS. 2A-B and 3, the collar 176 includes a disc shaped base section 182 having a diameter $d_C$ and a transition section 180 having a curved decrease in diameter from a larger diameter $d_{C1}$ formed at a front end of the transition section 180 to the smaller diameter $d_C$ of the base section 182.

In some embodiments, the larger diameter $d_{C1}$ at the front end of the transition section 180 ranges from about 70%× ($d_H$−2×radius of the convex curvature 177) to about $d_H$−2× radius of the convex curvature 177. In a particular embodiment, the diameter $d_{C1}$ is about 75%×($d_H$−2×radius of the convex curvature 177).

In some embodiments, the transition section 180 includes a concave curvature 185 formed between the rear face 174 of the head 170 and a side face 183 of the collar 176. In some embodiments, a radius of the concave curvature 185 can range from about 4 mm to about 8 mm. In a particular embodiment, the diameter of the concave curvature 185 is about 6 mm.

The base section 182 has a rear face 184. In some embodiments, the diameter $d_C$ of the base section 182 ranges from about 15 mm to about 25 mm. In a particular embodiment, the diameter $d_C$ is about 20 mm. In one embodiment, a diameter $d_C$ of the base section 182 is no less than about ½ of the diameter $d_H$ of the head portion 170.

Referring to FIGS. 2A-B and 3, the stem 178 has a cylindrical structure extending from the rear surface 184 of the base section 182. The stem 178 has a diameter of $d_S$. In some embodiments, the diameter $d_S$ of the stem 178 can range from about 5 mm to about 15 mm. In a particular embodiment, the diameter $d_S$ of the stem 178 is about 10 mm.

In some embodiments, the stem 178 can be formed integral with the collar 176. In other embodiments, the stem 178 can be made as a separate structural member and secured to the collar 176 by a fastening mechanism, such as threaded connection or the like.

In some embodiments, the stem 178 can be supported by a spring to bias the valve member 158 toward the discharge port 154 to assure responsiveness of the valve member 158. In some embodiments, a system gas pressure difference or a spring force can help cause the valve member 158 to engage firmly with or disengage with the valve seat 160, thereby respectively blocking or unblocking the flow passage 152. In some embodiments, at least a portion of the valve member 158 can be made of metal. In some other embodiments, at least a portion of the valve member 158 can be made of conformable materials such as for example plastic materials to improve sealability. As used herein, the term "conformable" refers to a material that is relatively soft and/or flexible which allows the structure made of the material to conform substantially in shape to a surface the structure engages with. For example, plastics or other suitable materials that can withstand a discharge port environment, e.g., high pressure, high temperature of compressor gas in a discharge port, may be employed.

Referring to FIGS. 2A-B and 3, in some embodiments, a plurality of guide vanes 186 can extend radially outwardly from the base section 182 of the collar 176 to help enlarge effectively the cross sectional area of the flow passage 152, thereby reducing flow obstruction through the valve assembly 150 (e.g., when the vanes 186 are compared to a solid disc located at the collar portion), for example, this can mean maximizing availability of the space of the flow passage and/or minimizing the impact due to obstruction of the structure of the valve. The guide vanes 186 are connected to or formed integrally with the base section 182. Each guide vane 186 has a root 188, which is the radially innermost portion of the vane, and a radial distal end 189, which is the radially outermost portion of the vane. In some embodiments, each vane 186 has relatively a flat plate shape. Each guide vane 186 can have a generally rectangular cross section. In other embodiments, each vane 186 has an airfoil shape.

The number of vanes 186 can vary, such as 3, 4, 5, etc. As shown in FIGS. 2A-B and 3, in some embodiments, the radial distal ends 189 define a circular shape having a diameter $d_V$ that can be greater than the diameter $d_H$ of the head portion 170 (referring to FIG. 5).

Referring to FIGS. 2A-B, 3 and 5, in some embodiments, a ring 192 can be used to connect radial distal ends 189 of the vanes. The ring 192 can help stabilize radial distal ends 189 of vanes 186. The ring 192 can have a diameter that is greater than the head 170. The head 170, the collar 176, the stem, and the ring 192 are coaxial.

The ring 192 can help enhance strength in the plurality of vanes 186, thereby improving integrity of the valve member 158. In some embodiments, the ring 192 is configured to be formed integrally with the vanes 186. In an alternative embodiment, the ring 192 is a separate structure.

In addition, the ring 192 can help support and centralize the valve member in the flow passage 152. Specifically, the ring 192 is configured to support the valve member 158 by such as for example forming an interference fit with the flow passage 152 through the ring 192. In other embodiments, the ring 192 is configured to have a diameter that is smaller than that of the flow passage 152.

Figure 4:
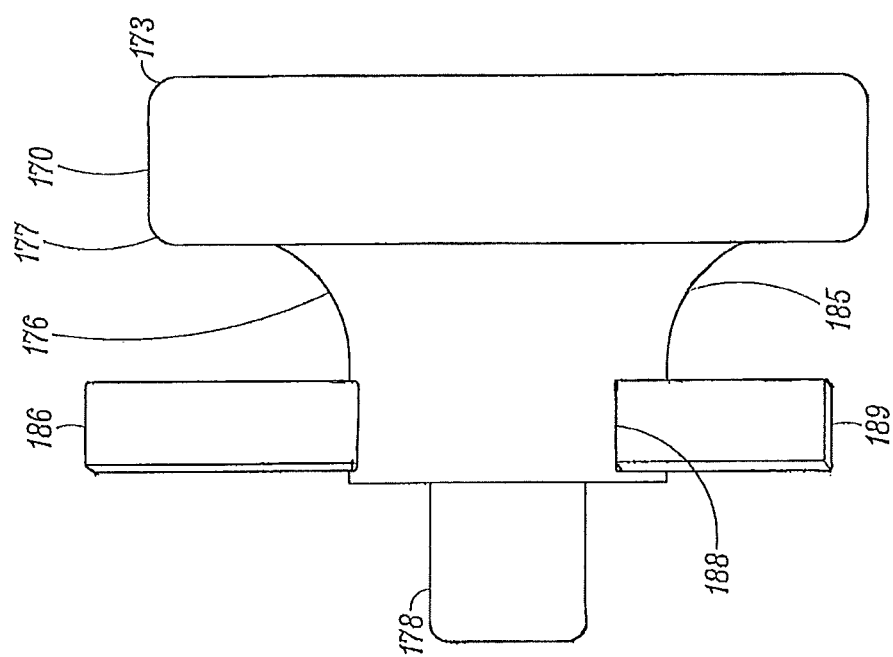
FIG. 4 is a side view of a further embodiment of a valve member that does not have a ring connecting radial distal ends of vanes.

FIG. 4 shows a similar valve member 150 as shown in FIG. 3. However, in the embodiment depicted in FIG. 4, the valve member 150 does not include a ring (e.g., the ring 192) that connects radial distal ends 189 of the vanes 186.

Figure 5:
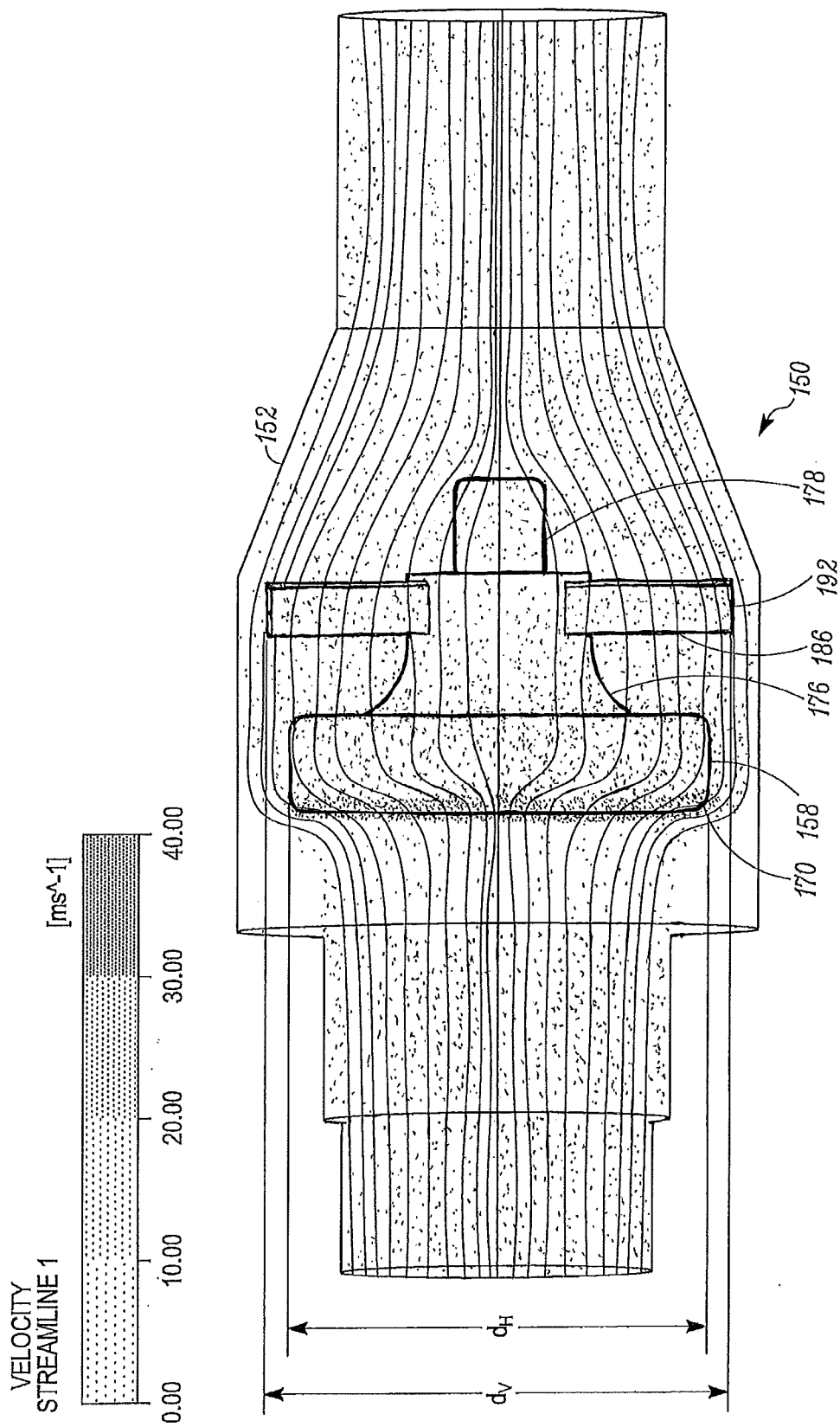
FIG. 5 shows velocity of gas flow passing around the valve member of FIGS. 2A-B and turbulence in the gas flow.

Referring to FIG. 5, the convex curvature 173 formed at the front edge of the head 170 of the valve member 158 can help reduce and/or minimize occurrences of sudden velocity changes that may occur at and/or around the front edge of the head 170. For example, as shown in FIG. 5, the convex curvature 173 can help maintain the velocity such as at about 20-30 m/s for example at a certain operation point(s), with relatively low occurrences of sudden velocity changes such as for example increasing velocities to about, e.g., 30-40 m/s, to occur at the front edge of the head 170, where such sudden velocity changes can contribute to pressure drop across the valve assembly The convex curvature 177 formed at the rear edge of the head 170 of the valve member 158 can help reduce and/or minimize occurrences of sudden velocity changes that may occur at and/or around the rear edge of the head 170. For example, as shown in FIG. 5, the convex curvature 177 can help maintain the velocity such as at about 20 m/s for example at a certain operation point(s), with relatively low occurrences of sudden velocity changes such as for example increasing velocities to about, e.g., 30 m/s, to occur at the rear edge of the head 170, where such sudden velocity changes can contribute to pressure drop across the valve assembly. The concave curvature 185 formed at the collar 176 of the valve member 158 can help reduce and/or minimize occurrences of sudden velocity changes that may occur at and/or around the collar 176. For example, as shown in FIG. 5, the concave curvature 185 can help maintain the velocity such as at about 10-20 m/s for example at a certain operation point(s), with relatively low occurrences of sudden velocity changes such as for example increasing velocities to about, e.g., 30 m/s, to occur at the collar 176, where such sudden velocity changes can contribute to pressure drop across the valve assembly.

The relatively large diameter $d_C$ of the base section 182 of the collar 176 (compared to collars of existing discharge valves) can each help streamline the gas flow passing around the valve member 158, thereby helping reduce loss of velocity of the gas flow. As a result, this helps reduce turbulence as compressed gas flows over and around the valve member 158, thereby reducing pressure loss in the flow of the compressed gas and streamlining the flow. Specifically, as shown in FIG. 5, these structures allow the flow of compressed gas around and past head 170 to be smoothened, and allow the flow passage 152 to be generally free of or at least have reduced occurrence of sharp fluctuations in its longitudinal cross section.

As shown in FIG. 5, the flow is decelerated at the front section (closer to the valve seat 160) of the head 170 of the valve member 158 and accelerated at the curvatures 173, 177 and 185 of the valve member 158, and then decelerated at the ring 192.

Figure 6:
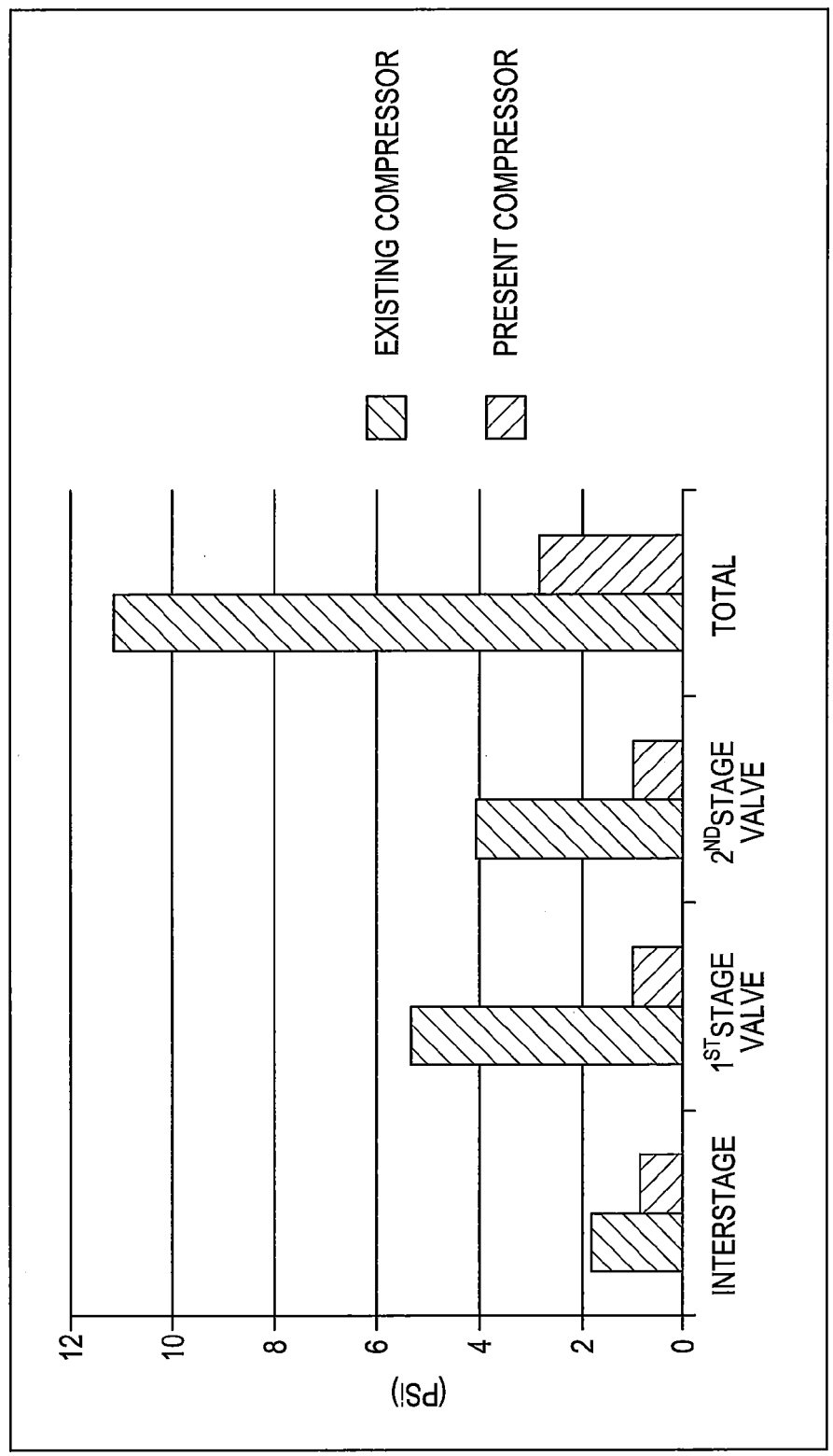
FIG. 6 is a chart showing a pressure loss in a two stage scroll compressor at an average operating condition.
Figure 7:
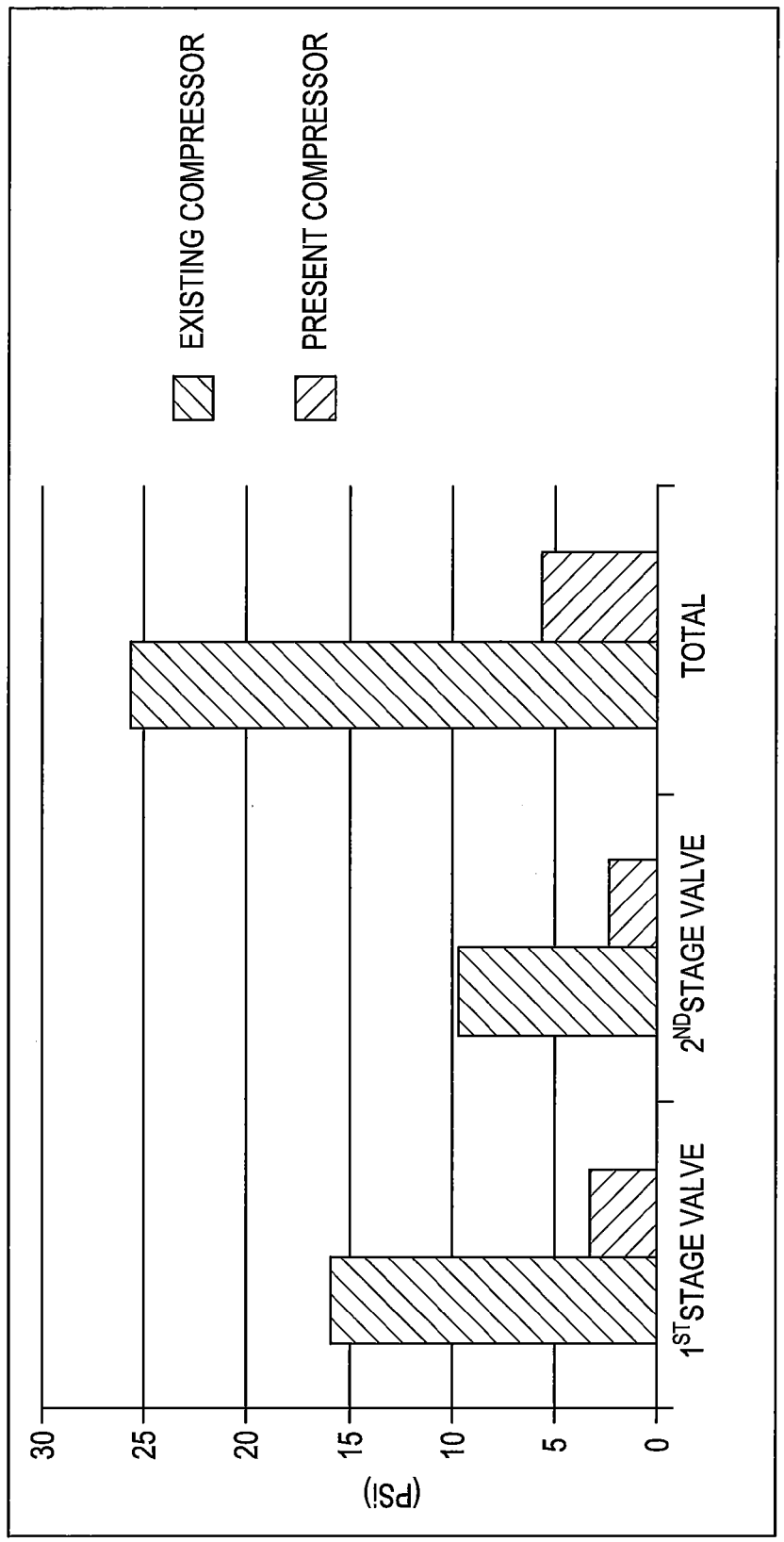
FIG. 7 is a chart showing a pressure loss in a two stage scroll compressor at a maximum operating condition.

FIG. 6 is a chart showing a pressure loss in a two stage scroll compressor at an average operating condition. FIG. 7 is a chart showing a pressure loss in a two stage scroll compressor at a maximum operating condition of the same compressor. With these features, pressure loss through the valve assembly 150 can be reduced to a minimum. In some embodiments, as shown in FIG. 6, at an average operating condition, the pressure loss of compressed gas flowing through a two stage scroll compressor may decrease from about 11 psi to 3 psi, and at a maximum operating condition, the pressure loss of compressed gas flowing through a two stage scroll compressor may decrease from about 25 psi to 5 psi. That is, the total pressure loss in the two stage scroll compressor equals about one fifth of the total pressure loss in an existing two stage scroll compressor. As a result, the efficiency of a compressor, e.g. compressor 10, can increase such as for example about 1.5%. As used herein, the term "average operating condition" refers to the average condition over a complete cycle of the compressor, i.e., the average mass flow rate. The term "maximum operating condition" refers to the instantaneous maximum operating condition over a complete cycle, i.e., maximum instantaneous mass flow rate.

Referring back to FIGS. 2A-B, when in a closed position, the valve member 158 is maintained firmly against the valve seat 160 by existing system pressure differences that may act for example as a biasing force. During the discharge of gas from the discharge port 154, a smooth contour of the valve member 158 formed by the curvatures 173, 177 and 185 helps streamline the compressed gas flowing around the valve member 158.

A number of embodiments of the invention have been described. Nevertheless, it will be understood that various modifications may be made without departing from the spirit and scope of the invention. Accordingly, other embodiments are within the scope of the following claims.

The invention claimed is:

1. A compressor having a system gas pressure, comprising:
   a flow passage defining an inlet, an outlet, and a valve seat located proximate the inlet; and
   a valve member, comprising:
      a head portion engageable with the valve seat, the head portion having a front face, a rear face located closer to the outlet than the front face, and a side face extending between the front and rear faces, the head portion further having a first convex curvature formed between the front face and the side face;
      a collar portion extending toward the outlet from the rear face of the head portion;
      a stem portion extending toward the outlet from a rear end of the collar portion, a diameter of the head portion is larger than a diameter of the collar portion, and the diameter of the collar portion is larger than a diameter of the stem portion; and
      a plurality of vanes extending radially outwardly from the collar portion,
   wherein the valve assembly is operable between an open position and a closed position,
   wherein when the valve assembly is in the closed position, the valve member is engaged with the valve seat at the front face of the head portion by the system gas pressure that forces the valve member against the valve seat, thereby blocking the flow passage, and
   wherein when the system gas pressure moves the valve member away from the valve seat, the flow passage is opened and the valve assembly is operated in the open position.

2. The valve assembly of claim 1, wherein the head portion further has a second convex curvature formed between the rear face and the side face of the head portion.

3. The valve assembly of claim 1, wherein the collar portion has a transition section having a concave curvature formed between a front end of the collar portion and a side face of the collar portion.

4. The valve assembly of claim 1, wherein the collar portion has a minimum diameter of ½ of the diameter of the head portion.

5. The valve assembly of claim 1, wherein the valve member further comprises an outer ring such that the plurality of vanes are extending radially between a side face of the collar portion and the outer ring.

6. The valve assembly of claim 1, wherein a radius of the first convex curvature ranges from 1 mm to about half of a distance defined between the front and rear faces of the head portion.

7. A method of guiding compressed gas to flow through a compressor having a system gas pressure, comprising:
   forcing a valve member against a valve seat formed on an inner surface of a flow passage by the system gas pressure, the flow passage defining an inlet, an outlet, the valve seat being located proximate the inlet; the valve member having:
- a head portion engageable with the valve seat, the head portion having a front face, a rear face located closer to the outlet than the front face, and a side face extending between the front and rear faces,
- a collar portion extending toward the outlet from the rear face of the head portion, and
- a stem portion extending toward the outlet from a rear end of the collar portion, a diameter of the head portion is larger than a diameter of the collar portion, and the diameter of the collar portion is larger than a diameter of the stem portion;

engaging the front face of the head portion of the valve member with the valve seat, thereby blocking the flow passage;

reducing the system pressure to release the engagement between the valve member and the valve seat;

opening the flow passage by moving the valve member away from the valve seat;

directing compressed gas to pass around a first convex curvature formed between a front face and a side face of a head portion of a valve member disposed in a flow passage, streamlining a flow of compressed gas when the flow passes around the first convex curvature, such that the first convex curvature helps minimize introduction of a pressure drop at a radial outer edge of the front face; and centering the valve member in the flow passage by a plurality of vanes extending radially outwardly from the collar portion.

8. The method of claim 7, further comprising: directing the compressed gas to pass around a second convex curvature formed between the rear face and the side face of the head portion, thereby streamlining a flow of the compressed gas when the flow passes around the second convex curvature, such that the second convex curvature helps minimize introduction of a pressure drop at an radial outer edge of the rear face.

9. The method of claim 7, further comprising: directing the compressed gas to pass around a concave curvature of a transition section, where the concave curvature is formed between a front end of the collar portion and a side of the collar portion, thereby streamlining a flow of the compressed gas when the flow passes around the concave curvature, such that the concave curvature helps minimize introduction of a pressure drop at the transition section.

10. A method of guiding compressed gas to flow through a compressor having a system gas pressure, comprising:

forcing a valve member against a valve seat formed on an inner surface of a flow passage by the system gas pressure, the flow passage defining an inlet, an outlet, the valve seat being located proximate the inlet the valve member having:
- a head portion engageable with the valve seat, the head portion having a front face, a rear face located closer to the outlet than the front face, and a side face extending between the front and rear faces,
- a collar portion extending toward the outlet from the rear face of the head portion, and
- a stem portion extending toward the outlet from a rear end of the collar portion, a diameter of the head portion is larger than a diameter of the collar portion, and the diameter of the collar portion is larger than a diameter of the stem portion;

engaging the front face of the head portion of the valve member with the valve seat, thereby blocking the flow passage;

reducing the system pressure to release the engagement between the valve member and the valve seat;

opening the flow passage by moving the valve member away from the valve seat;

directing compressed gas to pass around a first convex curvature formed between a front face and a side face of a head portion of a valve member disposed in a flow passage, streamlining a flow of compressed gas when the flow passes around the first convex curvature, such that the first convex curvature helps minimize introduction of a pressure drop at a radial outer edge of the front face; and stabilizing radial distal ends of vanes extending radially outwardly from a side face of the collar portion by an outer ring.

* * * * *